United States Patent Office 3,320,444
Patented May 16, 1967

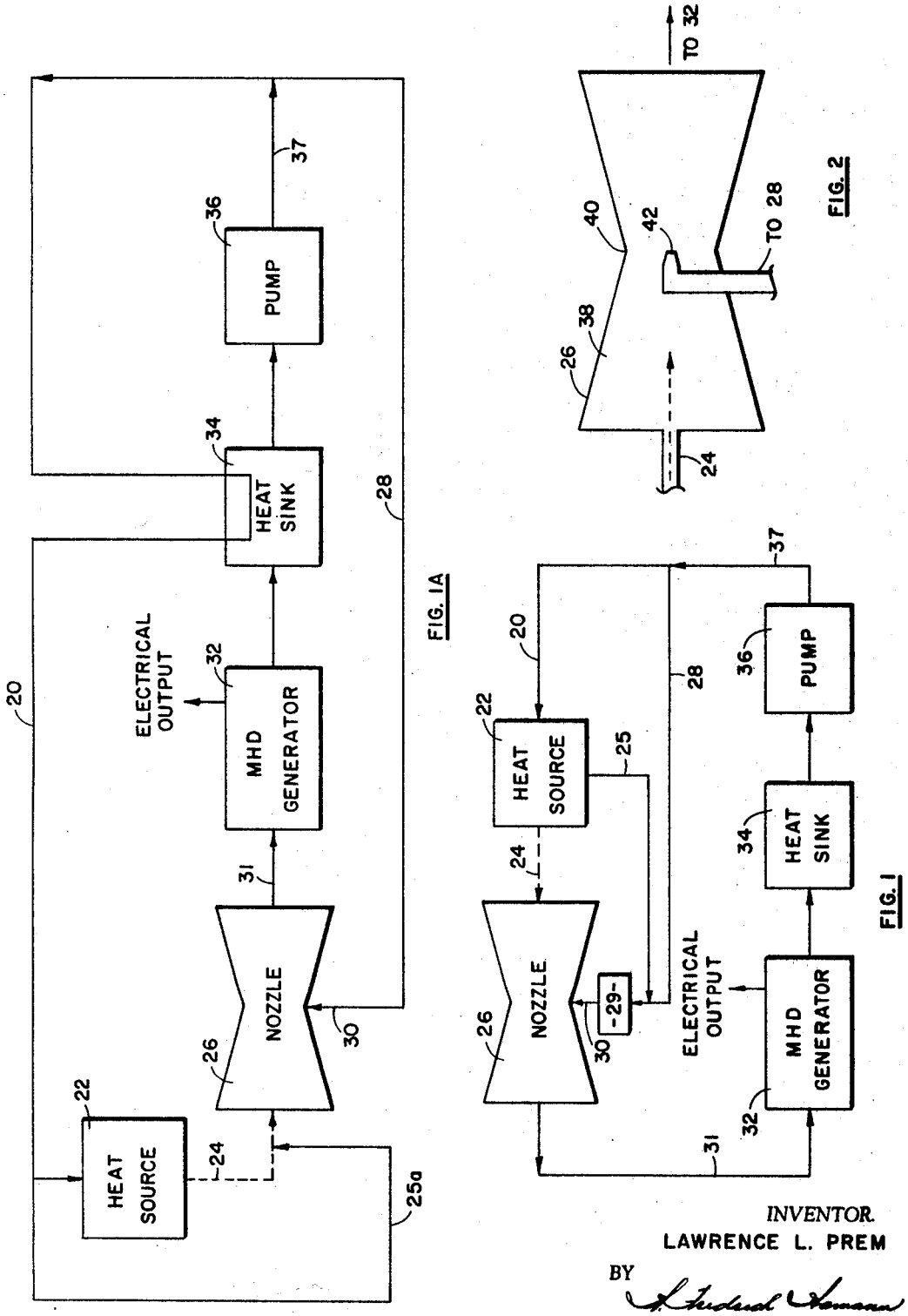

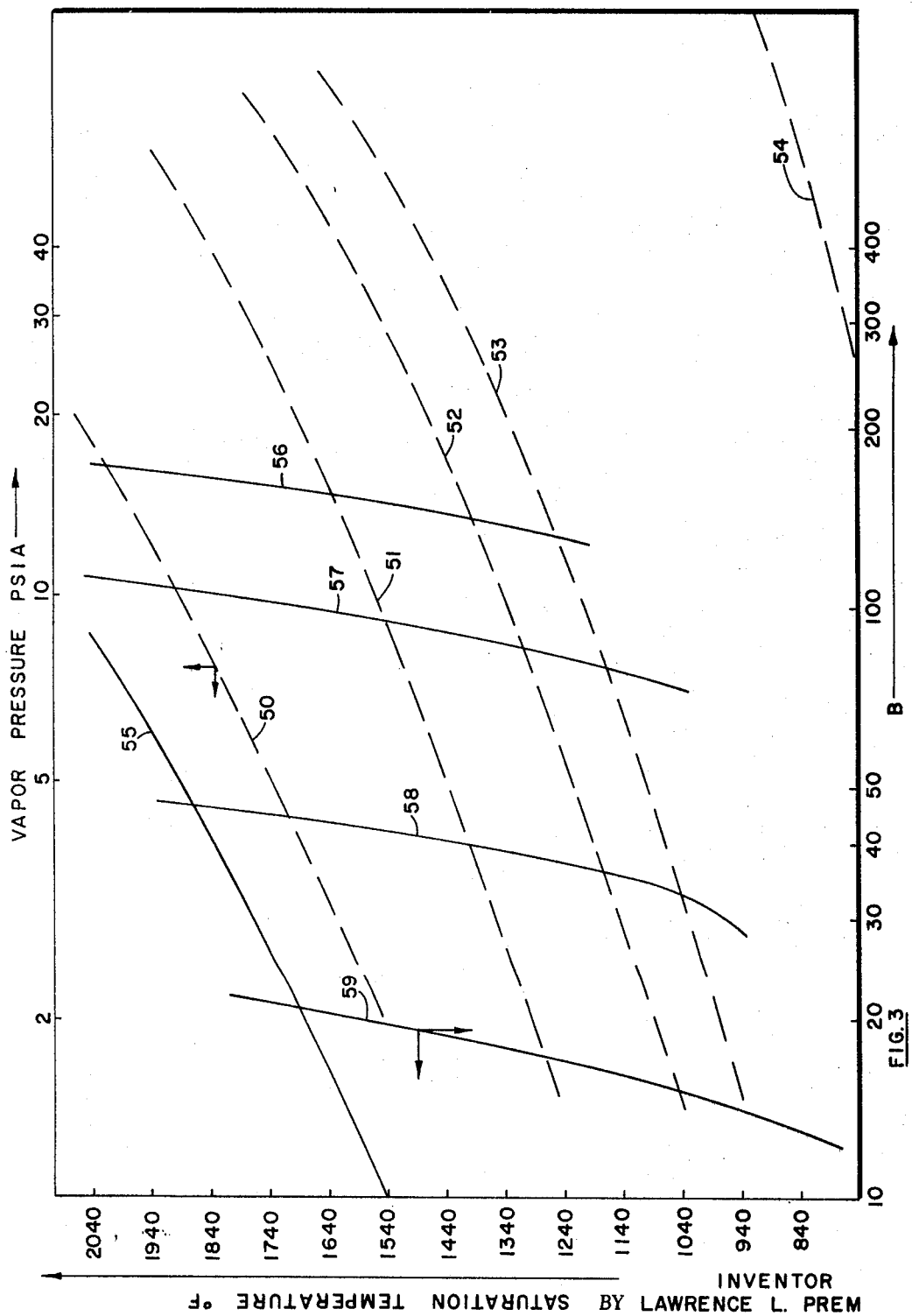

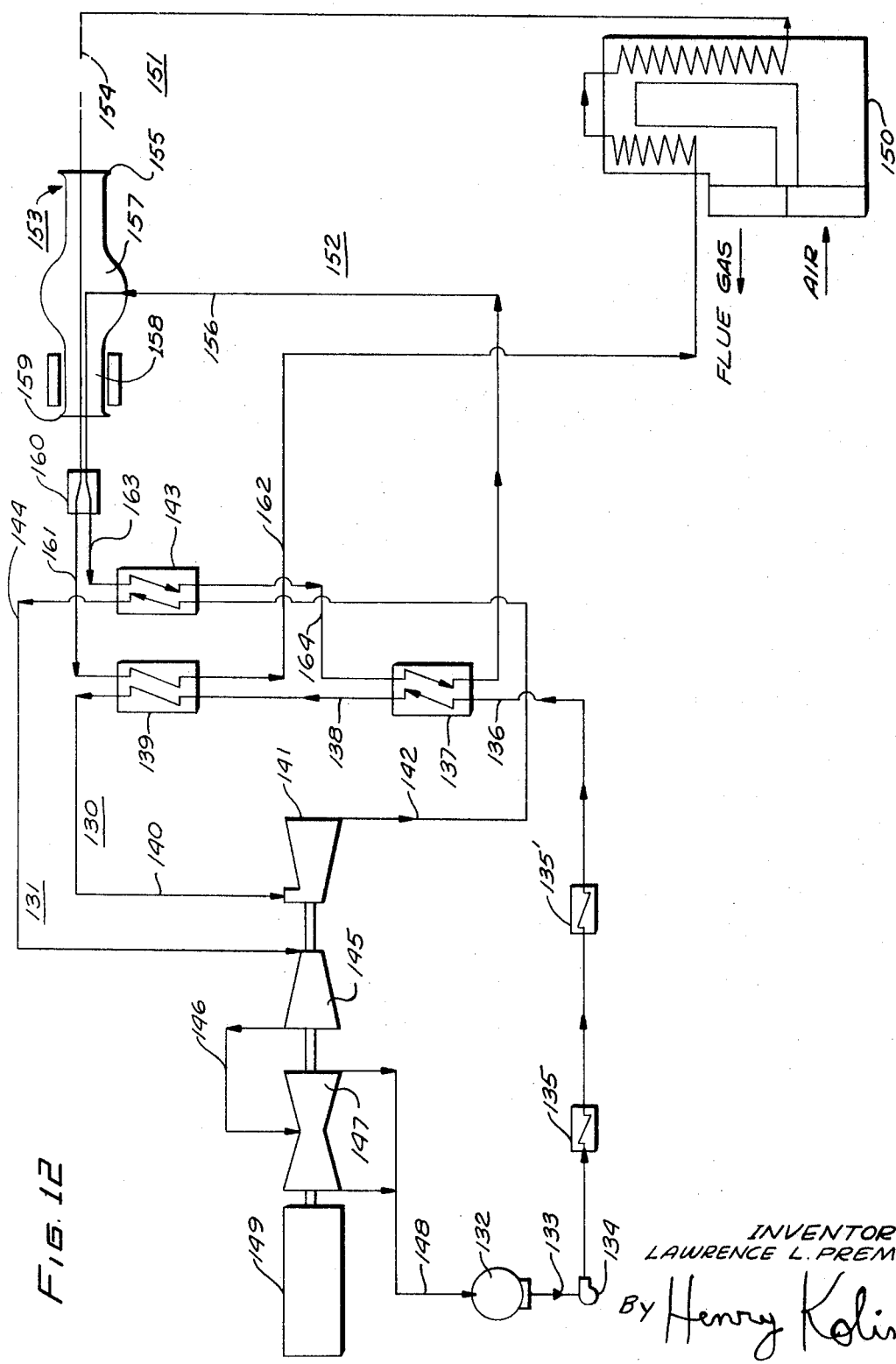

3,320,444
METHOD OF CONVERTING THERMAL ENERGY DIRECTLY TO ELECTRICAL ENERGY
Lawrence L. Prem, Tarzana, Calif., assignor to North American Aviation, Inc.
Filed June 28, 1965, Ser. No. 470,320
20 Claims. (Cl. 310—11)

This application is a continuation-in-part of application S.N. 274,384, filed April 17, 1963, which is a continuation-in-part of application S.N. 201,383, filed June 11, 1962, and since abandoned.

The present invention is directed to energy conversion and more particularly to the direct conversion of thermal energy to electrical energy utilizing the principles of magnetohydrodynamic conversion.

One of the direct conversion systems of the prior art which eliminates rotating elements is based upon magnetohydrodynamic (MHD) generators employing voltages induced in an ionized gaseous conductor traversing a magnetic field. Such MHD systems presently require high temperatures, since temperatures of the order of 4000° F. or higher are required for the working fluid to be sufficiently ionized to generate usable voltages when passing it through a magnetic field. At such high temperatures electrodes used for current collection are rapidly corroded because of the short time that existing materials can withstand these high temperatures and fluid flow. Methods of nonthermal ionization have been proposed, such as electron heating, ionization by seeding or electron injection, in order to operate the generator at a relatively lower temperature. However, such methods are subject to considerable uncertainty and generally require the use of highly complex equipment.

Accordingly, it is an object of the present invention to provide a method of direct conversion which avoids the problems inherent in the prior art MHD devices by utilizing a conductive working fluid not requiring either ionization or extremely high temperatures.

It is another object of the present invention to provide a relatively low temperature conductive liquid as the working fluid in an MHD generator not requiring moving parts or ionized gases.

In accordance with the present invention, a method is provided for the direct conversion of heat to electrical energy in an MHD-type device by using a two-phase working fluid wherein thermal to kinetic energy conversion first occurs followed by a kinetic to electrical conversion.

It is a feature of the present invention for directly converting heat to electricity utilizing general MHD concepts that vapor and subcooled liquid phases are provided, the vapor portion of the working fluid is reduced to a small volume fraction, or entirely condensed, by mass heat transfer between the vapor and the subcooled liquid phases, and, at the same time, the kinetic energy of the vapor phase is transferred to the resulting conductive working fluid.

The vapor phase may be utilized as either a wet, saturated or superheated vapor. The working fluid of this invention may consist of a single component or may be multi-component in nature. The subcooled liquid phase that is mixed with the vapor phase may have the same composition as the driving stream containing the vapor phase or may consist of another conductive component. In one aspect of this invention, in order to prevent condensation of the vapor phase prior to having imparted its kinetic energy to the injected subcooled liquid, it may be desirable to isothermally inject one or more saturated liquids into the driving stream prior to mixing it with the subcooled liquid. Other aspects of this invention relating to the use of multi-component working fluids will be hereinafter described.

Illustrative of the practice of this invention, a heat source is used to at least partially vaporize a liquid metal stream, which may consist of a single component or two or more liquid metals. The thermal energy of the partially vaporized fluid is converted into kinetic energy by expansion in a nozzle. The vapor fraction of the high velocity two-phase mixture is substantially condensed by injecting subcooled liquid particles downstream of the nozzle, the kinetic energy of the vapor being simultaneously transferred to the subcooled liquid thereby resulting in a high velocity conductive working fluid. This resulting conductive working fluid, essentially a high velocity liquid with a minimal vapor content, passes through a generator which can be designed for either alternating current or direct current power generation, so that at least a portion of the kinetic energy of the conductive working fluid is thereby converted to electrical energy. Preferably, after this partial conversion, the working fluid enters a diffuser where its remaining kinetic energy is converted to pressure, and the fluid is then split into two streams. One stream is returned to the heat source while the other is cooled in a heat sink, e.g., a radiator. Alternatively, where an integrated MHD and steam generating plant is utilized, the second stream will be fed to a heat exchanger to generate steam, which then will be fed directly to a steam turbine generator.

It is a preferred feature of this invention for achieving maximum cycle efficiency that at least a two-component system be utilized wherein one component is readily vaporizable and another component has a high specific heat. In a preferred aspect, the two components are relatively immiscible, e.g., lithium-potassium, in order to be easily separable after the mixture passes through the generator.

The present process is further characterized by providing a high kinetic energy fluid of high electrical conductivity just prior to entry into the electrical generator by eliminating most of the relatively non-conductive vapor through mass heat transfer and momentum exchange, rather than by requiring some external means of mechanical separation of liquid and vapor at this point.

These and other objects, features and advantages of the present invention will be more apparent from the following description and the drawings, made a part hereof, in which:

FIG. 1 is a schematic diagram of the direct conversion system utilizing the method of the present invention;

FIG. 1A is a schematic diagram of a second embodiment of the present invention;

FIG. 2 is a diagrammatic representation of the nozzle arrangement utilized in the present invention;

FIG. 3 is a graph showing the vapor pressure and kinetic energy factor as a function of temperature for various working fluids;

FIG. 12 is a schematic diagram of a sixth embodiment of the present invention utilizing the MHD system in combination with a steam system for a combined power plant.

Figure 4:
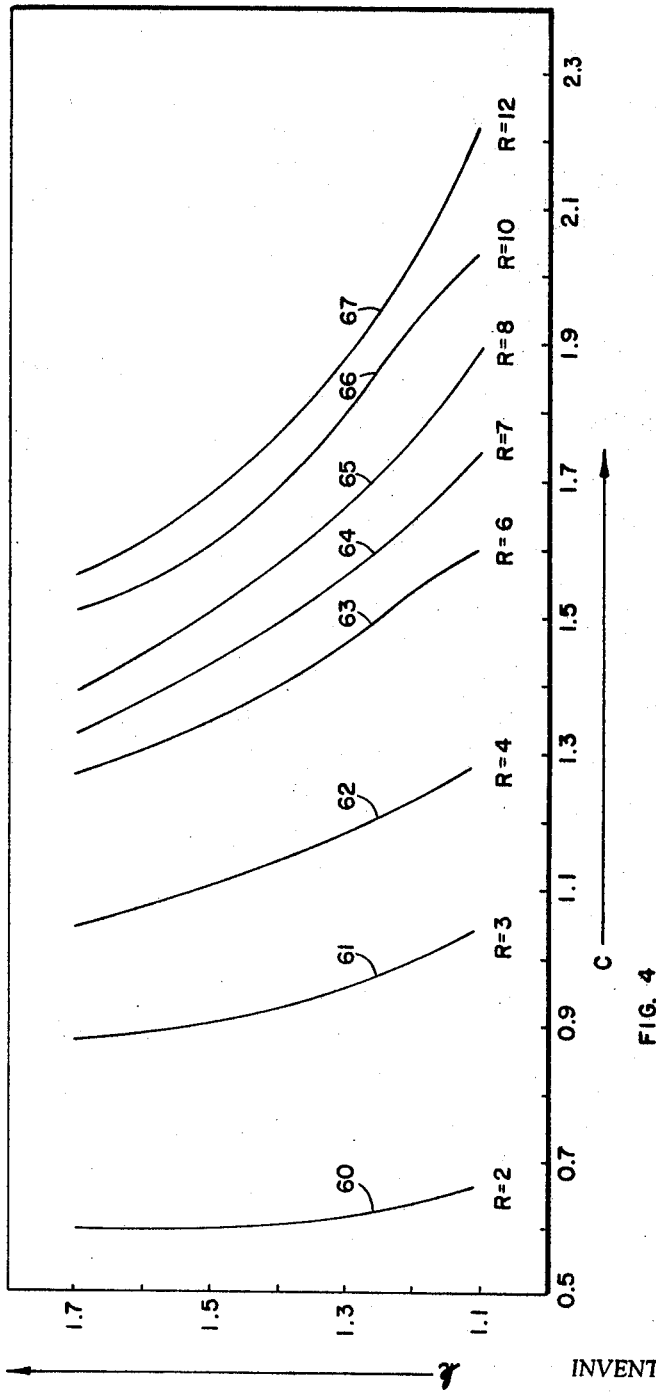
FIG. 4 is a graph of the available enthalpy factor of vapor as a function of $k$.

Referring now to the drawings in detail, FIG. 1 shows a schematic diagram of the system of the present invention, which comprises a first conduit 20 which introduces an electrically conductive fluid containing one or more components, at least one of which is vaporizable, into a heat source 22, including a boiler, in which the liquid is raised to a temperature higher than or equal to its vaporization temperature. The vapor phase of the conductive fluid, shown by dashed lines at 24, is passed to a means 26, indicated as a nozzle in a preferred embodiment, where the kinetic energy of the vapor is increased, e.g., by expansion, while simultaneously the thermal energy of the vapor is decreased, so that a high velocity driving vapor stream results. The vapor phase entering means 26 may be either a wet, saturated or superheated vapor. If a combination of liquids is used, two of which are vaporizable at different temperatures, then a second liquid may be conducted through an optional conduit 25 and mixed with the subcooled liquid flowing through a conduit 28. Where a single component liquid is utilized, conduit 28 contains a flowing subcooled stream of the same liquid which is vaporized. The subcooled liquid is conducted through a regulator 29 and enters nozzle 26 at point 30, and the subcooled liquid is injected into the driving stream of vapor at a single point or using multiple injection so that the kinetic energy of the driving stream will be transferred to the subcooled liquid. The point or points of injection of the subcooled liquid are preferably located at the nozzle constriction but may be located at any point or points in the nozzle so long as the injection is accomplished into a driving stream, i.e., at any of one or more points where at least a portion of the thermal energy of the vapor has been converted to kinetic energy. The pressure or flow regulator 29 controls the conditions for the injection of the subcooled liquid into the vapor stream in nozzle 26. The resulting fluid, which initially contains both liquid and vapor phases of the working liquid, is in the form of a fog. This permits a free exchange of thermal energy between the two phases when maintained in this condition for a time sufficient to ensure that the greater or entire portion of the vapor is condensed by mass heat transfer with the subcooled liquid and also that the kinetic energy of the vapor is transferred to the subcooled liquid. In this manner, the resulting conductive working fluid upon entering an MHD generator 32 consists essentially of the liquid phase, i.e., with the vapor phase preferably being present in an amount below 50 percent by volume, generally less than about 30 percent by volume so that high electrical conductivity is maintained. Since this high electrical conductivity fluid is required in generator 32 for operable conversion of the kinetic energy of the resulting fluid to electrical energy, the weight of the vapor fraction must be maintained at a small percentage of the weight of resulting fluid. After converting a large portion of the kinetic energy to electrical energy in generator 32, the remaining kinetic energy may be converted to static pressure by passage through a diffuser (not separately shown) and/or additional heat may be removed by the use of a heat exchanger or radiator indicated genereally as a heat sink 34. The liquid is then pumped by means of a pump 36, which may be omitted if sufficient pressure is present, through a conduit 37 to the input connection of conduits 20 and 28, which respectively form part of the vapor and liquid loops of the system.

Considering the system shown in FIG. 1, and its operation as described, with respect to a particular working fluid and a particular set of conditions of operation for such a preferred embodiment, a working fluid of sodium is pumped by pump 36 into conduit 20 at a temperature of 1215° F. and a pressure of 100 p.s.i.a. and then conducted to heat source 22. The heat source may be any well known source and is not described in detail herein. Its purpose is to raise the temperature of the sodium from 1215° F. to a temperature corresponding to or above the vaporization temperature of sodium, which is 1975° F. in a preferred embodiment. In this embodiment the optional conduit 25 is not required. The saturated or superheated vapor at 1975° F., allowing for a pressure drop through the source of 30 p.s.i.a., has a flow rate of 32.5 lb./sec. through conduit 24 and is fed into nozzle 26.

Referring to FIG. 2, which shows a detailed view of nozzle 26, the entering vapor is expanded in a chamber 38 of nozzle 26 where a portion of the thermal energy of the vapor is converted to kinetic energy. This driving stream is passed, through a constricted portion 40 of nozzle 26, at which point, or downstream of this point, the subcooled liquid is preferably injected, as at 42, in a direction parallel to the direction of flow of the driving fluid in order to promote momentum exchange between the two fluids. However, injection in the opposite direction or at an angle to the vapor flow direction may also be used. With a sodium vapor entering nozzle 26 at a temperature of 1975° F. and subcooled liquid at 1215° F., i.e. subcooled by about 760° F., approximately 11 lbs. of subcooled liquid must be injected into the vapor stream at 42 for every pound of sodium vapor injected into nozzle 26 in order to condense all the sodium vapor and provide sufficient kinetic energy to obtain 350 ft./sec. working fluid velocity having a temperature of about 1640° F. at the entrance to generator 32.

In order to attain mass heat transfer as well as interchange of kinetic energy between the vapor and the subcooled liquid, a certain minimum time is required before the vapor fraction, i.e., the weight of vapor to the total weight of liquid and vapor of the fluid, is sufficiently low so that the use of a standard MHD converter operating on a non-ionized, electrically conducting liquid medium is feasible. For the particular medium utilized in the preferred embodiment, it can be shown that both the mass heat transfer required and the acceleration of liquid necessary to obtain a resulting fluid useful in MHD direct conversion devices will take place in a small fraction of a second. Thus, the vapor fraction is reduced rapidly so that the distance between the point of injection of the subcooled liquid and the introduction of the resulting fluid into a direct conversion device is relatively short, e.g., between about 1 and 10 feet.

Magnetohydrodynamic generators, such as generator 32, which employ liquid metals are well known in the art in the form of direct and alternating current electromagnetic pumps and flow meters. In such direct current pumps the liquid metal flows between magnetic poles and receives direct current from conductors perpendicular to the magnetic field. The resulting electromagnetic force pumps the liquid. Other types of pumps are shown in U.S. Patents 2,764,095, 2,798,434 and 2,940,393, and reference should be made thereto for fuller details. Such pumps may be utilized as generators by imparting a force to the liquid metal, thereby forcing the liquid through the magnetic field which will generate a voltage across the terminals. The electrical output of the generator 32 may then be used in any known manner.

The temperature of the 1640° F. liquid entering the generator 32 will be changed to an extent dependent upon the particular design of the MHD converter and the friction of the liquid resulting from such a design. The fluid at the outlet of generator 32 will be reduced in velocity to about 250 ft./sec. from the 350 ft./sec. input velocity by the extraction of energy. The remaining kinetic energy present may be converted to static pressure by use of a diffuser, and a heat exchanger may be utilized having secondary heat-exchanging fluid for additional ble to the embodiment of FIG. 1A utilizing a potassium working fluid.

TABLE I.—APPROXIMATE OPERATION PARAMETERS FOR VARIOUS POSITIONS IN FIGS. 1 and 1A

| Position on Fig. 1 or 1A | Embodiment | | | |
|---|---|---|---|---|
| | Fig. 1 Sodium 100% Vapor Quality | Fig. 1A Potassium Superheated Vapor | Fig. 1A Potassium Saturated Vapor | Fig. 1A Potassium Wet Vapor (10 wt. %) |
| 24 | 1,975° F., 200 ft./sec., 32.5 lb./sec., 70 p.s.i.a. | 2,240° F., 150 p.s.i.a., 5.9 lb./sec. | 2,000° F., 150 p.s.i.a., 6.2 lb./sec. | 2,000° F., 150 p.s.i.a., 30 lb./sec. |
| 25 or 25a | None | 24.1 lb./sec., 1,400° F., 150 p.s.i.a. | 23.8 lb./sec., 1,400° F., 150 p.s.i.a. | None. |
| 31 | 1,640° F., 17 p.s.i.a., 350 ft./sec. | 1,400° F., 14.7 p.s.i.a., 63 lb./sec. | 1,400° F., 14.7 p.s.i.a., 63 lb./sec. | 1,400° F., 14.7 p.s.i.a., 63 lb./sec. |
| 37 | 1,215° F., 100 p.s.i.a., 392.5 lb./sec. | 650° F., 150 p.s.i.a., 63 lb./sec. | 650° F., 150 p.s.i.a., 63.0 lb./sec. | 650° F., 150 p.s.i.a., 63 lb./sec. |
| 20 | 1,215° F., 100 p.s.i.a., 32.5 lb./sec. | 1,400° F., 150 p.s.i.a., 30 lb./sec. | 1,400° F., 150 p.s.i.a., 30 lb./sec. | 1,400° F., 150 p.s.i.a., 30 lb./sec. |
| 28 | 1,215° F., 360 lb./sec., 15 ft./sec. | 650° F., 33 lb./sec., 150 p.s.i.a. | 650° F., 33 lb./sec., 150 p.s.i.a. | 650° F., 33 lb./sec., 150 p.s.i.a. |
| 30 | 1,215° F., 360 lb./sec., 100 p.s.i.a. | Same as 28 | Same as 28 | Same as 28. | power generation, or a diffuser and condensers may be used, all of which are contemplated for use in the present invention and are indicated generally as heat sink 34. The remaining thermal energy or the heat content of the fluid leaving generator 32 may be utilized in any ordinary energy conversion system, e.g., for the generation of steam.

The output of heat sink 34 is directed through pump 36 so that at the output of pump 36 a pressure of at least about 100 p.s.i.a. is maintained in both conduits 20 and 28 of the system.

FIG. 1A is a modification of the embodiment of FIG. 1 in that the operating conditions are substantially changed to provide for less quantity flow in the liquid loop with resulting reduced inventory for fluid storage and pumping power and to provide a more efficient system by requiring a smaller fraction of the resultant working fluid to be accelerated by means of the kinetic energy exchange. Corresponding parts are marked with corresponding reference numerals. In this embodiment conduit 20 is utilized as part of a cooling loop for heat sink 34 so that the liquid fed into heat source 22 is at a substantially higher temperature than the subcooled liquid in conduit 28. The same arrangement could be utilized in the embodiment of FIG. 1. In FIG. 1 optional conduit 25 was utilized as a means for atomizing the subcooled liquid in conduit 28 as it was injected into nozzle 26 at point 30. In the embodiment of FIG. 1A, a conduit 25a is utilized as a means for controlling the quality of the fluid at the inlet to nozzle 26. With the particular operating parameters of FIG. 1A, a 10 percent vapor fraction is taken as the optimum at the inlet to nozzle 26. In order to maintain this fraction, the liquid in conduit 25a is mixed with the vapor in conduit 24. Suitable valves and controls, not shown, for adjusting the relative flow rates may be provided.

Table I shows the approximate operating parameters for the embodiments of FIGS. 1 and 1A, where three different operating conditions are shown for FIG. 1A, i.e., superheated vapor, saturated vapor, or wet vapor in conduit 24. It should be noted that supercritical conditions could also be utilized in this embodiment if desired. Two of these operating conditions utilize conduit 25a through which the liquid (potassium) as 1400° F. is mixed with the vapor flowing through conduit 24 prior to its injection into nozzle 26. The remainder of the system, including the expansion of the working fluid to convert the thermal energy into kinetic energy and the transfer of this kinetic energy to the subcooled liquid injection at point 30 into nozzle 26, is the same as for the embodiment of FIG. 1. Therefore, this interchange of energy and the parameters associated with it will be described only with respect to FIG. 1 and the case of a sodium working fluid, although a similar interrelation is applicable to the embodiment of FIG. 1A utilizing a potassium working fluid.

The interrelation of the various parameters of such a system is shown in FIGS. 3–8. In particular, that portion of the system dealing with vapor and subcooled liquid mixing, the conversion of thermal energy to kinetic energy and the transfer of kinetic energy to the subcooled liquid will be described in detail; the remaining portion of the system utilizes components which are individually well known in the art.

With references to FIG. 3, the relationships of vapor pressure and saturation temperatures are shown by dashed curves 50 through 54 for exemplary liquid metals which could be used in the present invention, e.g., Li, 50; Na, 51; K, 52; Rb, 53; and Hg, 54, respectively. Also shown in FIG. 3 is the relationship between the saturation temperature and a factor B which is a function of the kinetic energy for the same liquid metals, as indicated by curves 55 through 59, respectively. Specifically, $$B = \frac{P_i A}{\rho_i} = \frac{P_i v_i}{778}$$

where $P_i$ = pressure at vapor inlet to nozzle 26
$\rho_i$ = density of vapor at inlet to nozzle 26
$v_i$ = specific volume of the vapor at inlet to nozzle 26
$A = 1/778$ conversion factor B.t.u./ft.-lb.

Thus, for the specific example of the preferred embodiment utilizing sodium having a vapor temperature of 1975° F. and a vapor pressure of about 70 p.s.i.a., a factor B equal to about 170 is obtained.

The available gas enthalpy, $\Delta h_g$, is defined by $$\Delta h_g = \left(\frac{k}{k-1}\right) B \left[1 - \left(\frac{p_o}{p_i}\right)^{\frac{k-1}{k}}\right]$$

where $k = C_p/C_v$,
$P_i/P_o$ is taken as R
$P_o$ = outlet pressure, then $$C = \left(\frac{k}{k-1}\right) \left[1 - \left(\frac{P_o}{P_i}\right)^{\frac{k-1}{k}}\right]$$

In FIG. 4 the values of C are plotted as a function of $k$. A family of curves 60 through 67, one for each value of R, is obtained where the values given are for isentropic expansion of vapor and B is assumed to be constant, i.e., about 170, as obtained from FIG. 3. The parameter R is a ratio of vapor inlet pressure to vapor outlet pressure.

For sodium, which in vapor form is essentially a monatomic gas, the value of $k$ is taken as 1.66. With a value of $P_i = 70$ an outlet pressure of $P_o = 10$, then $R = 7$ and, from curve 64, $$\Delta h_g = B \times C$$

Since $C=1.35$ and $B=170$, the value of the available enthalpy can be obtained. The available enthalpy is equal to $$\Delta h_\text{g} = \frac{W_1{}^2 - W_0{}^2}{2g} \times A$$

where $W_1$ is the velocity of the vapor just prior to the injection of the subcooled liquid, and $W_0$ is the velocity of the inlet vapor. Since $W_0$ is small compared to $W_1$ and becomes insignificant when the quantities are squared, the available enthalpy $$\Delta h_\text{g} = \frac{W_1{}^2}{2g} \times A$$

without significantly affecting the result. Thus, $W_1=3000$ ft./sec., i.e., the velocity of the vapor prior to injection of the subcooled liquid for the preferred embodiment.

Figure 5:
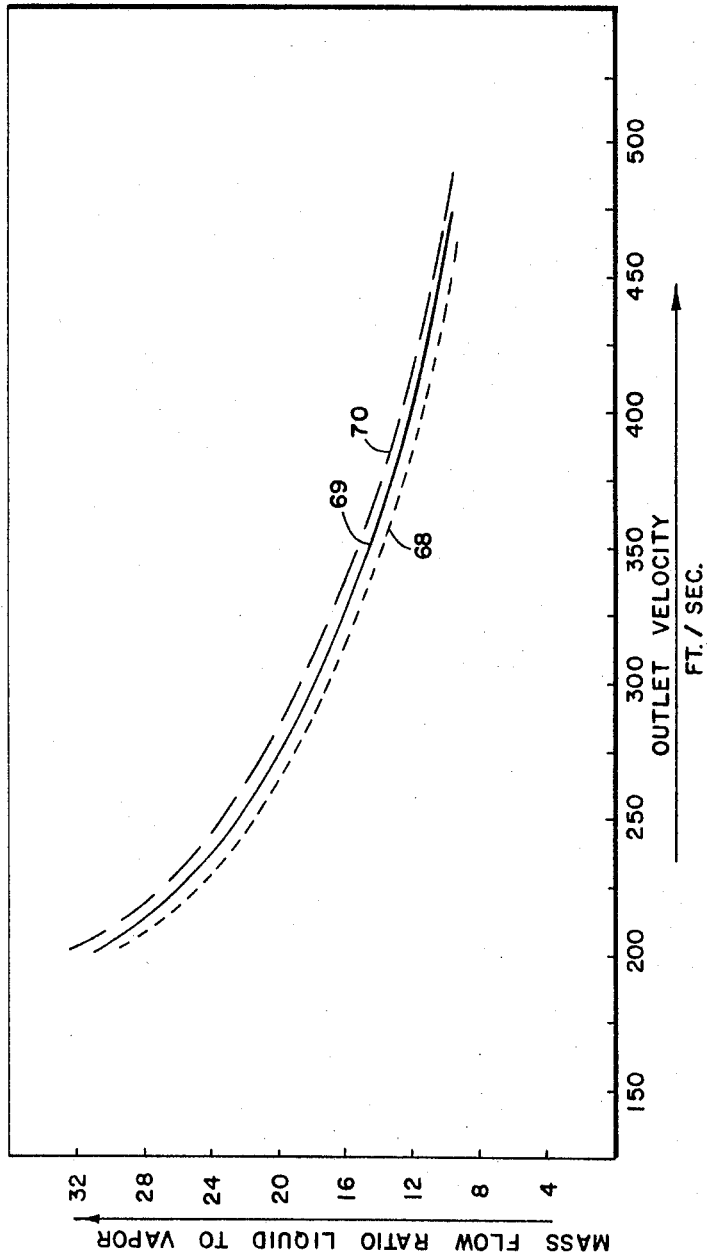
FIG. 5 is a graph of the relationship of mass flow ratio of liquid to vapor and outlet velocity for a preferred embodiment of the present invention.

In FIG. 5, the nozzle outlet velocity as a function of liquid to vapor mass flow ratio for the sodium working fluid embodiment is shown by curves 68, 69, and 70, with an inlet liquid pressure of 100 p.s.i.a., a nozzle throat to outlet pressure ratio of 3.5, a nozzle back pressure of 10 p.s.i.a., and various gas inlet conditions, i.e., 50, 70, and 100 p.s.i.a. saturation being shown by curves 68, 69, and 70, respectively. Those curves are based upon a frictionless isentropic process for the preferred working fluid, sodium, under the system conditions shown in FIG. 1. Similar curves for other conditions and working fluids may be calculated in accordance with well known principles. (See Elementary Engineering Thermodynamics, V. W. and C. A. Young, 2nd ed., Chapter X, McGraw-Hill Book Company, Inc., New York, 1941.) The primary effect of fraction on such a relationship, depending upon the liquid particle size, is to increase or decrease the distance from the throat of the nozzle to the point (1) where the desired outlet velocity is attained and (2) where essentially complete mass heat transfer is attained between the hot vapor and the liquid, i.e., the point where the vapor fraction is reduced to about 30 percent by volume or lower.

The elementary drag considerations in such a process (see Binder, Fluid Mechanics, 3rd ed., Chapter 11, Prentice-Hall) are as follows:

$$\text{Drag} = C_\text{D} \frac{\rho}{g} \frac{V^2}{2} \quad \text{(A)}$$

where $C_\text{D}$=drag coefficient
$\rho_\text{g}$=density
$V$=average velocity of gas
$A$=projected area of spray particle.

With a Reynolds number of 4840, a drag coefficient of 0.4, an average velocity of 2600, and a density of 0.052, $$\text{Drag} = 5.5 \times 10^2 \pi r^2$$

The force required to accelerate liquid particles from a $V_1=30$ ft./sec. to a $V_0=400$ ft./sec., is defined as $$F = m_1 \frac{\Delta v}{\Delta t} = \text{drag}$$

so that $\Delta t = 40r$, where $r$ is the liquid particle size in inches. It is therefore apparent that for liquid particle sizes from 10 to several hundred microns, for example, the time required to accomplish the noted acceleration of the liquid will be significantly less than a second. Since the mass heat transfer must take place during this acceleration, it is important that the time required to accomplish the mass heat transfer be of the same order of magnitude.

Considering now the mass heat transfer from the vapor to the liquid, the Fourier number (see Jacobs, Heat Transfer, pages 287 et seq.) is defined as $$F_\text{n} = \frac{kt}{\rho C_\text{p} r^2}$$

where $k$=thermal conductivity
$\rho$=density
$C_\text{p}$=specific heat
$r$=radius of vapor particle.

Also, $$F_\text{n} = \frac{\alpha t}{r^2} \text{ and } \alpha = \frac{k}{\rho C_\text{p}}$$

For the usual range of particle size, i.e. 10 to several hundred microns ($\mu$), the time required for substantially complete mass heat transfer to take place will be of the order of a small fraction of a second. Thus, the attainment of the required velocity, i.e., the transfer of the kinetic energy from the expanded vapor to the injected liquid, will take place in about the same amount of time as that required for the transfer of the heat to the liquid, but in all cases in a very short time.

Figure 6:
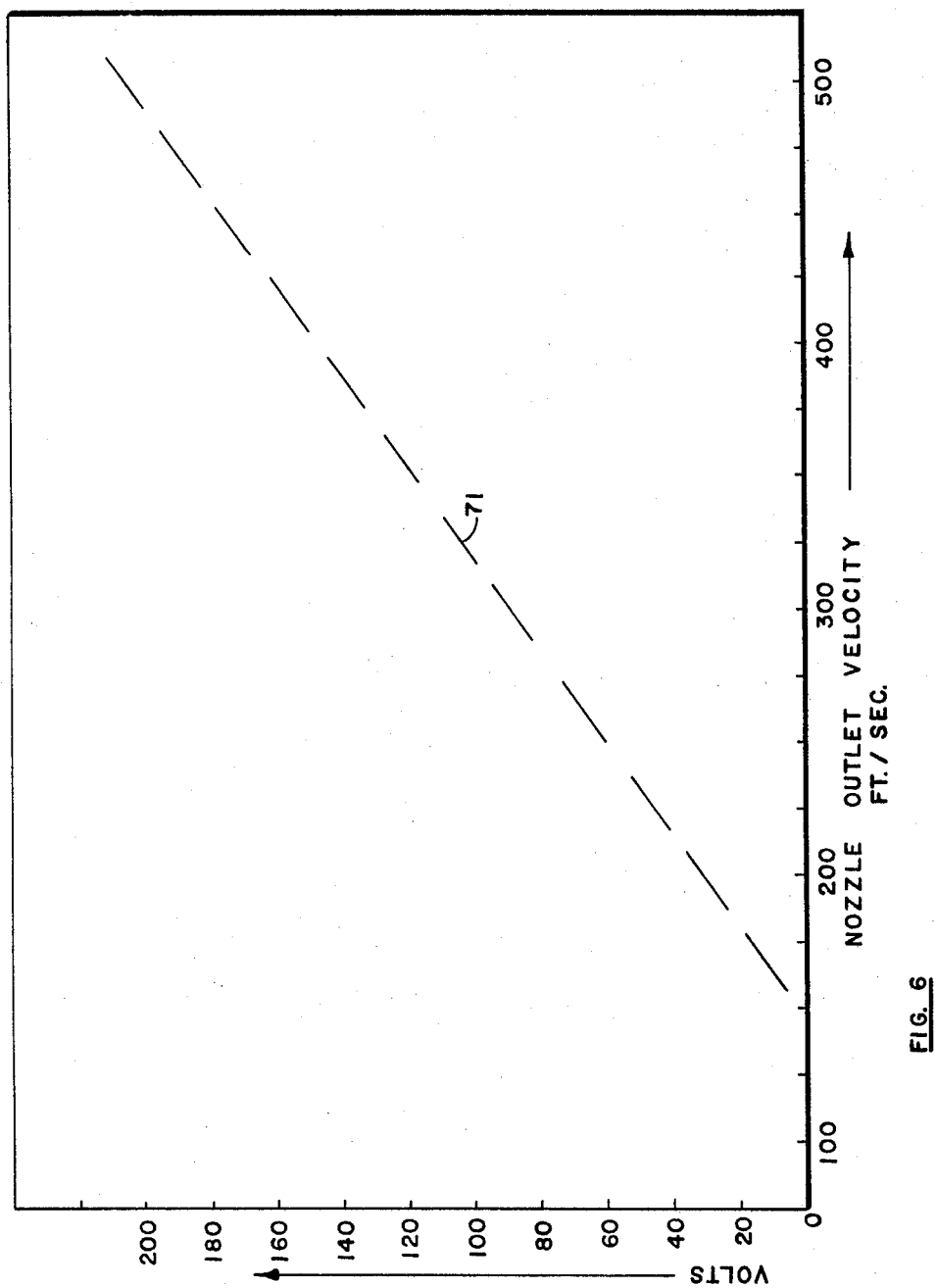
FIG. 6 is a graph of the relationship of the nozzle outlet velocity and voltage generated in the converter.

Referring now to FIG. 6, the voltage generated in an MHD converter as a function of nozzle outlet velocity is shown for a sodium working fluid flow of 500 lb./sec. through a 20,000 gauss field for 100 ft./sec. velocity drop. At a generating current of 4200 amp. and a selected output voltage of 120 volts available voltage, it is seen from curve 71 that a nozzle outlet velocity of 350 ft./sec. is required. Considering the value with respect to FIG. 5, it is seen that a maximum mass flow ratio of liquid to vapor, for curve 69, is 14.5. Thus, for the above electrical output the initial injection of vapor and liquid must have a ratio of vapor to liquid by weight of less than or equal to 1 to 14.5 respectively, which is equal to a ratio of vapor to liquid volume of 77.5 vapor to 1 of liquid. The mass heat transfer between the vapor and liquid and the interchange of kinetic energy takes place from the nozzle to outlet, and during this time the vapor fraction is reduced by a fractor of about 175 so that proper operation of the converter 24 is possible.

Figure 7:
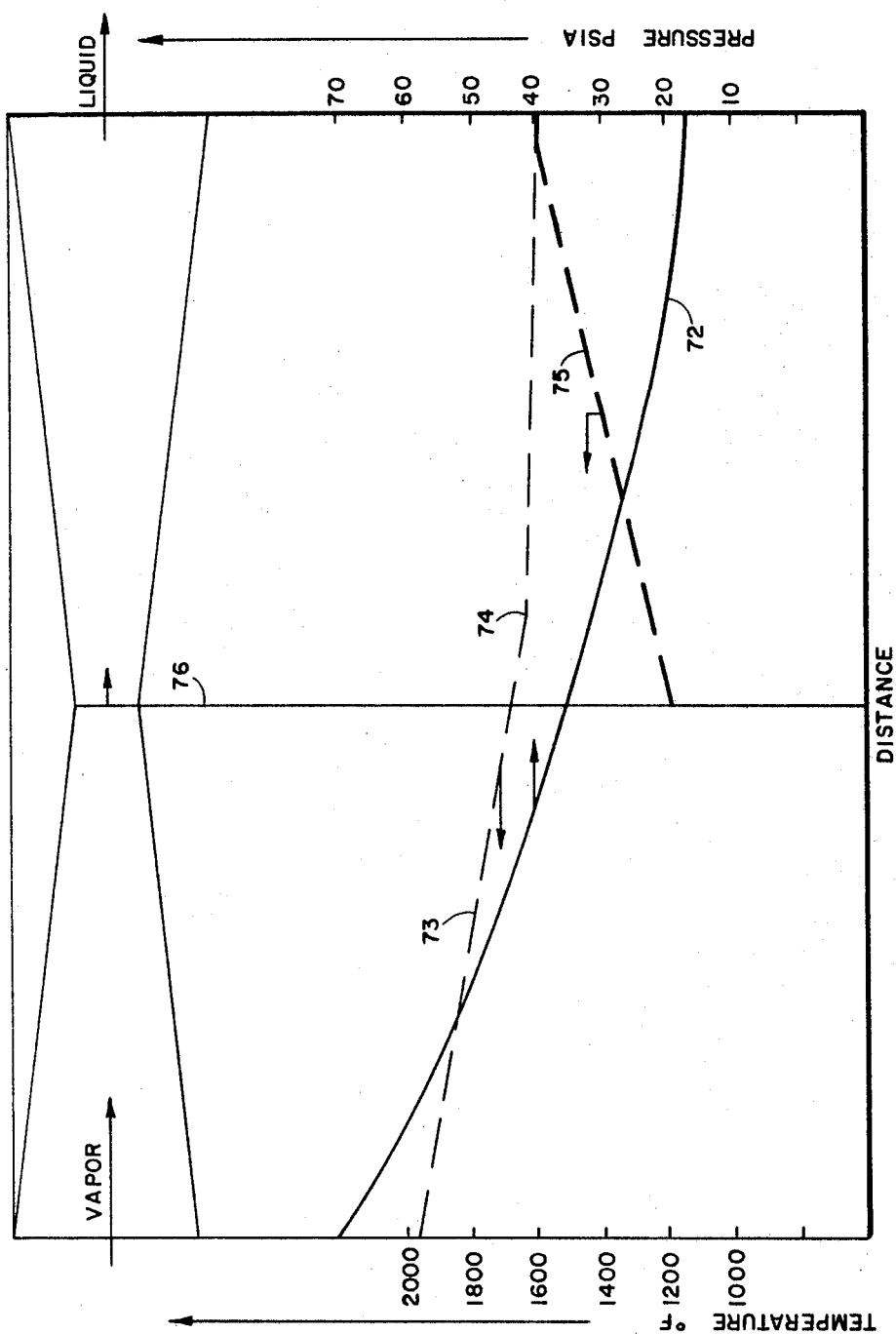
FIG. 7 is a graph of the changes in temperature and pressure of the vapor and liquid in the nozzle.
Figure 8:
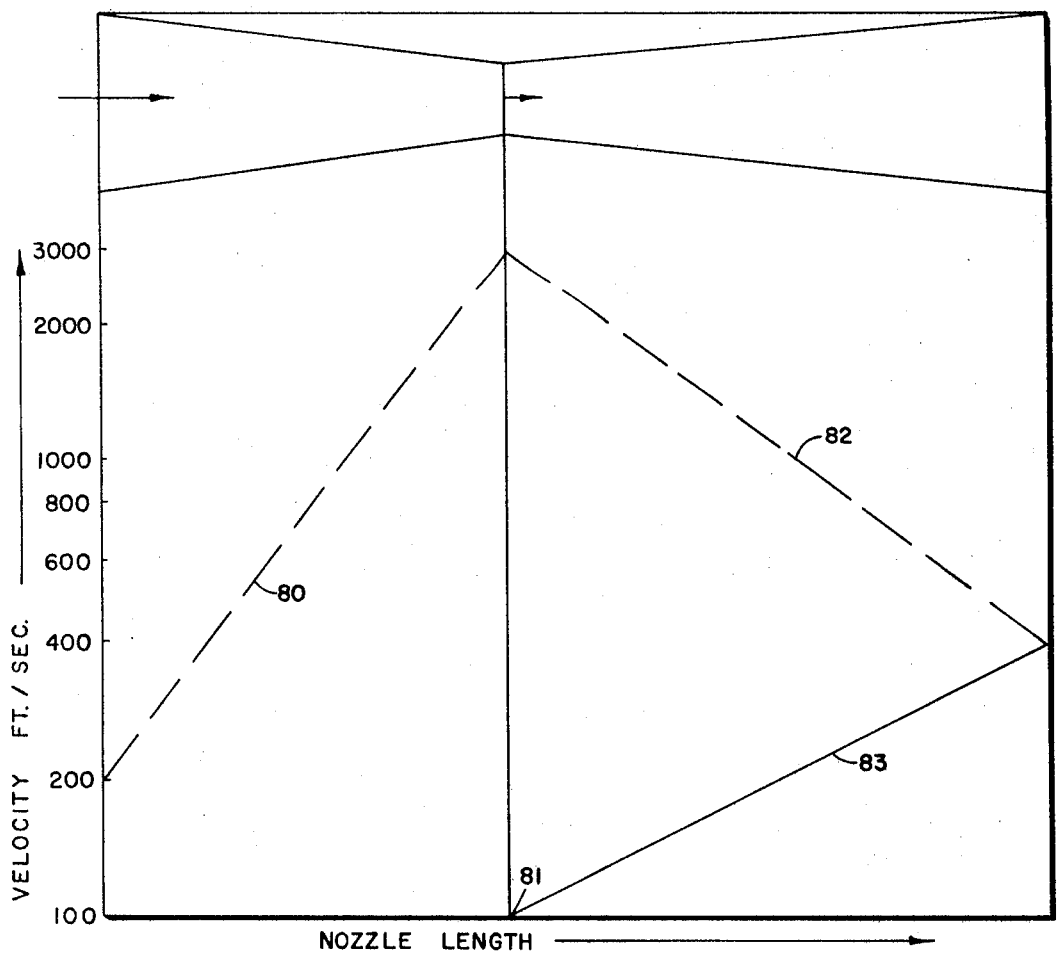
FIG. 8 is a graph of the velocity changes of the vapor and liquid in the nozzle.

A representation of these cooperating mechanisms in the method of the present invention is shown in FIGS. 7 and 8. A schematic diagram of the nozzle is shown in each of these figures with the point of liquid injection together with a series of curves depicting the relationship between pressure and temperature of the vapor and liquid (FIG. 7) and velocities of the vapor and liquid (FIG. 8). Specifically, curve 72 (FIG. 7) shows the pressure drop throughout the length of the nozzle. Curve 73, which represents the vapor portion, shows the gradual decrease in temperature along the length of the nozzle to a point of inflection 74. This point shows the temperature and approximate position in traveled distance where the vapor changes to the liquid state because of mass heat transfer to the liquid. Curve 75 shows that the liquid, injected at point 76, gradually increases in temperature due to mass heat transfer from the vapor and attains a final temperature of about 1640° F. prior to its injection into the MHD converter 32.

FIG. 8 shows the vapor and liquid velocity as a function of distance along the nozzle length. Specifically, the vapor curve 80 has an inlet velocity of 200 ft./sec., which is increased due to expansion of the nozzle, i.e., the conversion of thermal energy to kinetic energy, to a value of about 3000 ft./sec. (sonic velocity) at the throat 40 (see FIG. 2) of the nozzle 26. The subcooled liquid is injected at point 81 into the throat 40 of nozzle 26. While the liquid is passing through conduit 28 at a rate of 15 ft./sec., this rate is increased to 100 ft./sec. at the exit of the liquid orifice 42 (see FIG. 2), i.e., the point where the liquid is injected into the expanded vapor driving fluid. The interchange of thermal and kinetic energy between the vapor and the liquid over the remaining distance of the nozzle length to the outlet point is graphically depicted by curves 82 and 83. Curve 82 represents the idealized reduction in vapor velocity, and curve 83 represents the increase in liquid velocity from the throat to the nozzle outlet. For simplicity, both of these curves are shown in FIG. 8 as straight-line relationships on the basis that the interchange of kinetic energy and the mass heat transfer are taking place at equal rates and at the same time. Actually, the velocity of the vapor may increase beyond sonic velocity and the liquid acceleration may be other than linear. However, regardless of the theoretical explanation of the energy interchange between vapor and liquid, it has been shown that the two phenomena take place within about the same time, and the exact form of the curves is not essential to an understanding of the process of the present invention. The essential aspect to the interchange of energy is that the vapor fraction is substantially reduced and that the kinetic energy of the liquid is increased to about 400 ft./sec., as shown in FIG. 8.

In FIGS. 9–12 are shown several embodiments of the present invention which provide improvements in overall cycle efficiency by reducing the amount of injected subcooled fluid that is required while still resulting in a high conductivity fluid. Because of this reduced injection flow rate, losses due to momentum exchange between the vapor and subcooled liquid are reduced. By utilizing multicomponent liquids, which may vary from total miscibi'ity to substantial immiscibility of the components, the amount of injected subcooled liquid may be reduced where this injected liquid has a correspondingly high specific heat. Another component, used for the vapor loop, has a high vapor pressure and supplies the thermal energy as a vapor to the nozzle.

Figure 9:
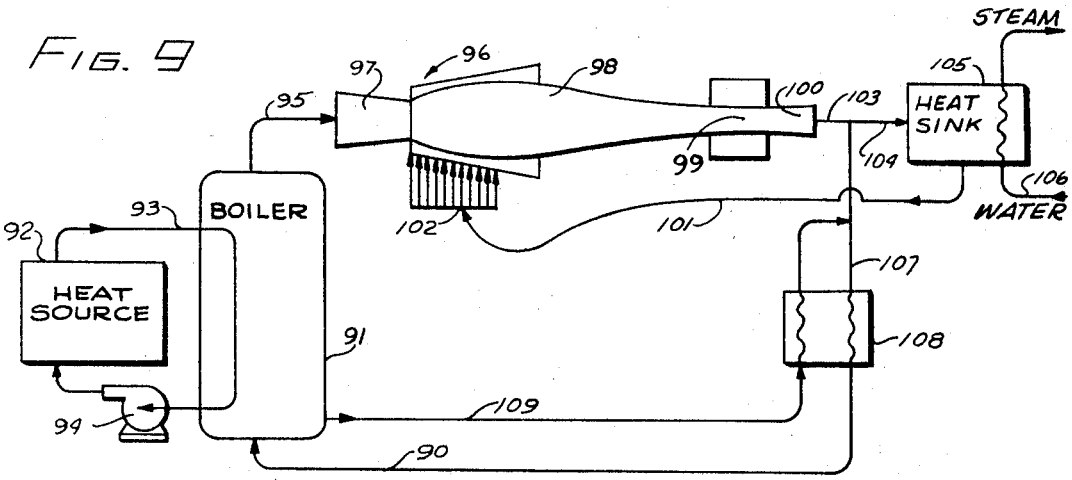
FIG. 9 is a schematic diagram of a third embodiment of the present invention suitable for use with multicomponent miscible liquids.

In FIG. 9 is shown a diagrammatic representation of an embodiment of the present invention in which multicomponent miscible liquids are utilized. A mixture of two or more miscible liquid metal components is conducted through a conduit 90 to a boiler 91. A heat source 92 is used to heat a fluid which is circu'ated in a closed conduit loop 93 by means of a pump 94 through boiler 91. Conveniently, for space applications, the heat source utilized is a nuclear reactor and the circulating heat-transfer fluid is sodium or potassium liquid metal. Pump 94 is preferably an electromagnetic pump, thereby eliminating moving mechanical parts. Heat source 92 may also be a radioisotope. For other applications, particularly where conventional sources of heat are employed such as fossil fuels, the heat source loop 93 may be eliminated and boiler 91 heated directly.

In the present invention, an important loss of efficiency occurs in the momentum exchange between the injected subcooled liquid and the high kinetic energy fluid stream leaving the nozzle. By reducing the flow rate of injected liquid, the loss in available kinetic energy of the resultant working fluid can also be reduced. This is accomplished by utilizing a first liquid metal component with a high vapor pressure, i.e., which is readily vaporizab!e and supplies thermal energy as vapor to the nozzle. A second liquid component has a high specific heat. This component is utilized as the subcooled liquid to inject into the MHD converter and condense the vapor. The injection mass flow rate can be reduced because of the high specific heat of this second liquid component. As a result of this reduced injection flow rate, losses due to momentum exchange are also reduced. Other components may also be included in the multicomponent mixture depending upon the particular physical or electrical properties desired. Thus where a constituent has a high vapor pressure it would contribute principally to the vapor phase entering the MHD nozzle. Another component may be selected that has high electrical conductivity in order to provide good conversion efficiency in the generator section. Or a component that is of low cost may be used simply as a diluent in order to reduce the cost of the working fluid used in the system. Advantageously, a mixture of lithium-potassium is suitable and preferred in the practice of this invention. Lithium is a component with a high specific heat, and would therefore be utilized as the subcooled liquid, potassium is a component with a high vapor pressure and would provide the thermal energy to the nozzle. Other combinations of lithium with sodium, potassium, rubidium or cesium are also technically feasible.

Illustratively, in FIG. 9, a mixture consisting of 10 weight percent potassium vapor and 90 weight percent mixed potassium and lithium liquid is conducted from boiler 91 through a conduit 95 into an MHD converter 96. This converter is illustratively shown as a unitary structure which comprises a nozzle region 97, where conversion of thermal energy to kinetic energy occurs; a driftube region 98, where the two streams consisting of the high velocity vapor stream and the injected subcooled liquid stream intermingle and exchange momentum and also result in vapor condensation; a generator region 99, for production of electrical energy; and a diffuser region 100, for conversion of kinetic energy to pressure. The fluid entering nozzle region 97 has its kinetic energy increased, while simultaneously its thermal energy is decreased, so that a high velocity driving vapor stream is generated. The subcooled liquid of high specific heat, illustratively lithium, flows through a conduit 101 where it is injected utilizing multiple-point injection into nozzle region 97 at points 102. Because of the high specific heat of the injected subcooled fluid, there is less of a loss of kinetic energy occurring during the momentum exchange and condensation of the vapor, which occur in the driftube region 98 of MHD converter 96. The resu'tant high velocity working fluid, which may preferably contain up to 50 volume percent of vapor, generally below about 30 volume percent, passes through the magnetic field of generator region 99 whereby electricity is generated. The kinetic energy of the working fluid is then converted to pressure by passage through diffuser region 100.

The working fluid leaves converter 96 through a conduit 103 and is then split into two streams. One stream is led through a conduit 104 to a heat sink 105 where it is cooled and is then returned through conduit 101 as the injected subcooled liquid.

Part of the heat remaining in the effluent working fluid may be utilized to produce steam for use in a conventional turbine generator. This is schematically shown by the flow of water into the intake of a steam cycle loop 106, which is in heat-exchanging relationship with heat sink 105, and the emergence of steam from the exit portion of this steam cycle loop.

The second stream from conduit 103 is conducted by a conduit 107 into a heat exchanger 108 and then into conduit 90 to constitute the feed stream to boiler 91. Fluid flow of a side stream through a conduit 109, which provides a path from boiler 91 to conduit 107 after passage through heat exchanger 108, serves to maintain a relatively constant concentration of the different components present in boiler 91. Thus the presence of the side stream flow in conduit 109 results in relatively uniform values of efficiency.

Figure 10:
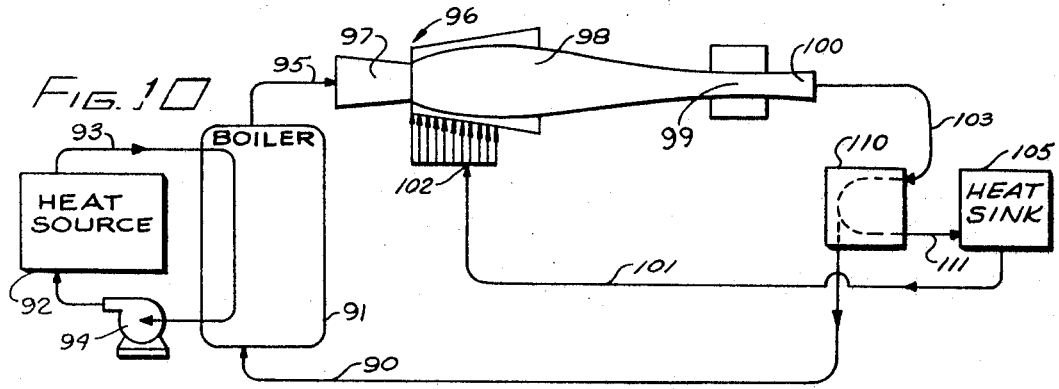
FIG. 10 is a schematic diagram of a fourth embodiment of the present invention suitable for use with relatively immiscible liquids.

In FIG. 10 is shown a schematic illustration of an embodiment of the present invention ultizing multicomponent liquids which are relatively immiscible. Parts in FIG. 10 corresponding to those shown in FIG. 9 have been marked with corresponding reference numerals. Illustratively, a lithium-cesium mixture may be utilized where lithium serves as the injected subcooled fluid because of its high specific heat, and cesium serves as the high vapor pressure component to provide the thermal energy in the form of a vapor that is fed to the nozzle region of the MHD converter.

Referring to FIG. 10, the fluid that is conducted through conduit 90 to boiler 91 consists principally of the readily vaporizable component, illustratively cesium. The fluid in the boiler is heated by heat source 92, as described for FIG. 9. The vaporized cesium is conducted through conduit 95 to nozzle region 97 of MHD converter 96. The subcooled liquid conducted through conduit 101 consists essentially of a high specific heat liquid, illustratively lithium. This liquid is injected at multiple points 102 into the converter, and momentum exchange and condensation occur within driftube region 98. Electricity is generated by passage of the resultant conductive working fluid through the magnetic field of generator region 99.

The effluent fluid from the MHD converter is conducted from diffuser region 100 by way of conduit 103 to a separator 110, illustratively shown as a centrifugal type of separator, where the lithium and cesium components are separated, the lighter lithium being conducted through a conduit 111 to heat sink 105 for return to the MHD converter as a subcooled liquid through conduit 101. The readily vaporizable component, e.g., cesium, is returned to boiler 91 by way of conduit 90 for recycle in the process.

Figure 11:
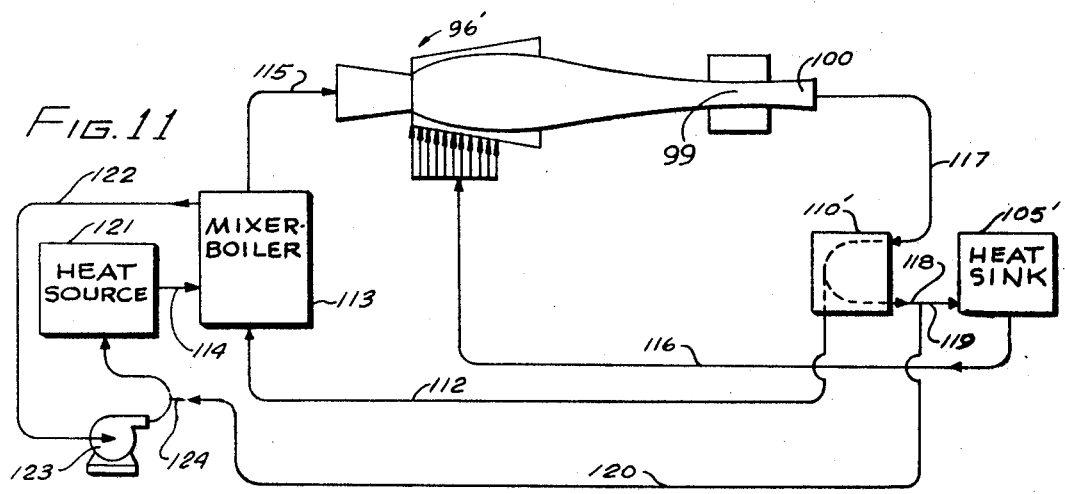
FIG. 11 is a schematic diagram of a fifth embodiment of the present invention suitable for use with partially immiscible liquids.

In FIG. 11 is shown an embodiment of the present invention utilizing multicomponent liquids which are partially immiscible. Illustratively, a mixture of potassium and lithium is shown, the degree of miscibility of these liquid metals being a function of the temperature of operation of the system. In the embodiment shown, the potassium rich-stream is led through a conduit 112 to a mixer-boiler 113 where it is mixed with a heated lithium-rich stream conducted to mixer-boiler 113 through a conduit 114. The potassium-rich heated stream emerging from mixer-boiler 113 preferably contains about 10 percent by weight of potassium vapor and is conducted through a conduit 115 to an MHD converter 96'. The lithium-rich stream is conducted through a conduit 116 to the MHD converter and injected therein so that there is a resultant momentum exchange and condensation and generation of electricity as previously described. The effluent stream from the MHD converter is conducted through a conduit 117 to a separator 110'. The potassium-rich stream from the separator is conducted to mixer-boiler 113 by way of conduit 112 as previously described. The lithium-rich stream from separator 110' is led through a conduit 118 and then split into two streams. One stream flows through a conduit 119 to heat sink 105' and is then returned to MHD converter 96' by way of conduit 116 as the subcooled injected fluid. The other lithium-rich stream is conducted by way of a conduit 120 to a heat source 121, which includes a boiler region, so that the high heat content of the lithium-rich stream may be utilized in mixing with the potassium-rich stream in mixer-boiler 113. A lithium-rich side stream is removed from mixer-boiler 113 by way of a conduit 122 and recirculated by means of a pump 123 and a conduit 124 so as to form a loop for maintaining a constant proportion of lithium in the system.

Advantageously, by using a multicomponent fluid the amount of injected subcooled fluid may be reduced by a factor of 5 or more. Thus with a single-component fluid, an approximately equal weight of subcooled liquid compared with the nozzle fluid will be used for injection into the MHD converter to effect momentum exchange and condensation. However, with a multicomponent system containing a high specific heat liquid, for example, a lithium-potassium system, only 0.2 pound of lithium is required for injection for each pound of potassium fluid having 10 percent by weight of vapor introduced into the MHD converter. This effectively serves to almost double the efficiency of a two-component system compared with a single component system while still obtaining equal or better electrical conductivity at the operating temperature of the cycle.

In FIG. 12 is shown a schematic diagram of a power plant utilizing a conventional steam system in combination with the MHD system of this invention employing a multicomponent working fluid so as to provide a power plant with a net gain in efficiency. The steam system per se illustratively provides a net output of 198,700 kilowatts with an efficiency of 42.3 percent and a net heat rate of 8070 B.t.u. per kilowatt-hour. In the steam system portion of the plant, a main steam cycle 130 and a reheat steam cycle 131 are utilized. Illustratively, for one set of conditions, feedwater at a temperature of about 100° F. flowing from a condenser 132 is conducted through a conduit 133 and a pump 134 to a series of feedwater heaters 135 and 135' and brought to a temperature of 472.5° F. with a flow rate of $1.35 \times 10^6$ lb./hr. The heated feedwater is then led through a conduit 136, a steam evaporator 137, a conduit 138, and a steam superheater 139, being converted to steam during this flow and thereby forming part of the main steam loop 130. The steam is then conducted by a conduit 140 to a high pressure turbine 141 at a temperature of approximately 1000° F. and at 2415 p.s.i.a. The effluent steam at a temperature of 630° F., pressure of 555 p.s.i.a., and flow rate of $1.18 \times 10^6$ lb./hr. is conducted through a conduit 142 to a steam reheater 143 to constitute the reheat steam loop 131. The reheat steam at 1000° F. and 499 p.s.i.a. is conducted through a conduit 144 to an intermediate pressure turbine 145 and then by way of a conduit 146 to a low pressure turbine 147 and returned to condenser 132 by a conduit 148. A generator 149 is activated by movement of the turbines.

For the combined plant a single furnace system is utilized. The MHD system portion of the combined plant is designed for a net output of 50,500 kilowatts at a net efficiency of 10.6 percent utilizing a relatively immiscible potassium-lithium mixture. Illustratively, the heat source utilized is a conventional furnace 150 operating by combustion of a mixture of air and a fossil fuel with consequent evolution of flue gas. The MHD system illustrated basically comprises a potassium-rich vapor loop 151 and a lithium-rich subcooled liquid loop 152. The potassium-rich stream, which illustratively has a 10 percent vapor content, is conducted to an MHD converter 153 by a conduit 154. This stream just prior to entry into the MHD converter is at a temperature of 1600° F. with a heat content of 471 B.t.u. per pound and a flow rate of $6.59 \times 10^6$ pounds per hour. The heat content of this stream is converted to kinetic energy by expansion through a nozzle region 155 of the converter. The lithium-rich subcooled liquid is conducted to the MHD converter by way of a conduit 156 at a temperature of 500° F. with a heat content of 891 B.t.u. per pound and a flow rate of $1.38 \times 10^6$ pounds per hour. Thus the subcooled liquid is introduced at a temperature that is lower by 1100 degrees than that of the vaporized fluid. There is a resultant exchange of momentum and condensation of vapor in driftube region 157 of the converter. For convenience in identifying the potassium-rich and lithium-rich streams, these are shown as separate streams in passing through the magnetic field of the generator region 158 of the converter, although in actual practice a homogeneously intermixed working fluid is present. After passing through the diffuser region 159 of the converter, the working fluid stream enters a separator 160, conveniently of the centrifugal type, at a temperature of about 1130° F. The potassium-rich stream emerges from the separator through a conduit 161 with a 3.8 percent vapor content by weight at a temperature of 1144° F., a heat content of 335 B.t.u. per pound and a flow rate of $6.59 \times 10^6$ pounds per hour. This potassium-rich stream then passes through steam superheater 139 in heat-exchanging relationship with the steam flowing through the main steam loop 130. It is then returned by way of a conduit 162 to furnace 150 at a temperature of 715° F., heat content of 224 B.t.u. per pound and flow rate of $6.59 \times 10^6$ pounds per hour for recycle in the system.

The lithium-rich stream emerges from separator 169 through a conduit 163 at a temperature of 1144° F., heat content of 1523 B.t.u. per pound and flow rate of $1.38 \times 10^6$ pounds per hour. It then passes through steam reheater 143 in heat-exchanging relationship with the steam in reheat steam loop 131, its temperature being reduced to 965° F., with a heat content of 1345 B.t.u. per hour. It is then lead through a conduit 164 through steam evaporator 137 in heat-exchanging relationship with the steam in the main steam loop 130. The lithium-rich stream emerges at a reduced temperature of 500° F., heat content of 891 B.t.u. per pound, and flow rate of $1.38 \times 10^6$ pounds per hour. This stream is then conducted by conduit 156 for injection into MHD converter 153.

The combined plant represents a gain in heat efficiency compared with a conventional steam system alone. This comparison is shown in the following tabulation:

|  | Steam System | MHD System | Combined Plant |
|---|---|---|---|
| Net output, kilowatts | 198,700 | 50,500 | 249,200 |
| Efficiency, percent | 42.3 | 10.6 | 52.3 |
| Net heat rate, b.t.u. per kilowatt hour | 8,070 |  | 6,526 |

It is apparent from the above-described method of directly converting thermal energy in an MHD converter as illustrated in the various embodiments of the invention that basically a two-stage conversion process is utilized, i.e., the heated vapor is first expanded to convert a large portion of its thermal energy to kinetic energy, and this kinetic energy is then utilized to drive a conductive liquid through an MHD converter to convert the kinetic energy to electrical energy. It is a principal feature of this second stage that there is injection of a subcooled liquid into the high velocity vapor stream so that there occurs a simultaneous transfer of the remaining thermal energy of the vapor to the driven liquid; thereby the vapor fraction is reduced to a value which does not inhibit the direct conversion of kinetic energy to electrical energy in the MHD converter.

Preferably, both the vaporizable fluid and the subcooled liquid are electrically conductive and are selected from the alkali metals. However, it is within the scope of the present invention that only one of these liquids, or neither, is conductive provided the resultant working fluid is electrically conductive, or rendered so by suitable treatment, prior to passage through the magnetic field of the generator region.

While a preferred embodiment contemplates passing the driven fluid directly from the nozzle region of the MHD converter to the generator region, it is within the scope of the present invention to utilize condensation inducers between the nozzle and the generator. Such condensation inducers may include ultrasonic vibration, surface treatment, special additives to the working fluid, or magnetic, thermal, or pressure shock. Also contemplated by the present invention is the addition of materials to improve the electrical properties of the working fluid. However, such modifications are not limitations to the method of the preferred embodiment.

It will be further understood that for certain applications it may be convenient for reasons of economy and simplicity of design to employ a single fluid for both the vaporized fluid and the subcooled liquid loops. For other applications the use of multicomponent fluids is contemplated and desirable. Thus while an MHD plant operating at 1600° F. in accordance with this invention using a single working fluid such as potassium can realize 25 percent of Carnot cycle efficiency, a two-component working fluid, e.g., potassium-lithium or cesium-lithium, provides 40 percent efficiency. Other combinations of multicomponent fluids may be used where one component has a high specific heat content, and therefore would be used as the subcooled liquid, and another component is readily vaporizable. Various alkali-metal mixtures, with lithium preferably one component because of its high specific heat, are particularly suitable and preferred in the practice of this invention where multicomponent fluids are utilized.

Advantageously, with fluid-metal MHD converters, either D.C. or A.C. power generation is feasible, whereas with conventional MHD plasma devices, A.C. power generation appears impractical because of extremely low active-to-reactive power ratio. Also the fluid-metal MHD converter herein operates at temperatures as low as 1300° F. with an electrical conductivity of its working medium of $1 \times 10^6$ mho per meter, or 10,000 times that of plasmas produced thus far. Further, because of the relative incompressibility of the working medium its mechanical energy can be converted to electrical energy at constant pressure or at constant velocity. In general, as a D.C. generator, the fluid-metal MHD converter of this invention provides a particularly suitable high power, high current and low voltage device. As a three-phase A.C. induction generator, the estimated efficiency is 85 percent, with a power factor between .75 and .85 for a 60-c.p.s. generator.

Although several particular and preferred embodiments of the present invention have been described, various modifications will be apparent to those skilled in the art. Thus, in FIGS. 1 and 1A, all of the effluent fluid leaving MHD generator 32 is shown as being cooled by passage through heat sink 34. Alternatively, for certain applications, it may be desirable to cool only that portion of the effluent liquid that serves as the recycle subcooled fluid. The remainder of the effluent fluid is then returned directly to heat source 22 for vaporization and recycle in the system. Thus while we have described the principles of the invention in connection with specific materials and procedures, it is to be clearly understood that this description is made only by way of example and not as a limitation to the scope of the invention as set forth in the objects thereof and in the accompanying claims.

I claim:

1. The method of converting thermal energy into electrical energy by mixing of two fluids at least one of which is electrically conductive, comprising the steps of heating a fluid, vaporizing at least a portion thereof, increasing the kinetic energy of said vaporized fluid while simultaneously decreasing its thermal energy to form a driving stream, mixing said driving stream with a subcooled fluid so that a substantial portion of the vapor of said driving stream will condense out because of heat transfer between said driving stream and said subcooled fluid while simultaneously transferring kinetic energy of the vapor of said driving stream to said subcooled fluid to form a resulting conductive working fluid, and passing said resulting conductive working fluid through a magnetic field to convert at least a portion of its kinetic energy to electrical energy.

2. The method of claim 1 wherein said vaporized fluid is selected from the class consisting of wet, saturated or superheated vapors of at least one alkali metal.

3. The method of claim 1 in which said subcooled fluid is a substance selected from the class consisting of metals and alkali metals in liquid form.

4. The method of claim 1 wherein said vaporized fluid and said subcooled fluid are of substantially identical chemical composition.

5. The method of claim 1 wherein the resulting working fluid formed by mixing of said vaporized fluid with said subcooled fluid has a vapor fraction of less than about 30 percent by volume.

6. The method of claim 1 wherein said step of forming a vaporized fluid includes preselectedly controlling the quality of said vapor.

7. The method of claim 1 which includes the step of controlling the quality of said vaporized fluid prior to increasing the kinetic energy of said fluid.

8. The method of claim 1 wherein said vaporized fluid is expanded for a time sufficient to transform a predetermined portion of its enthalpy to kinetic energy prior to being mixed with said subcooled fluid.

9. The method according to claim 1 wherein a saturated liquid is injected into said driving stream prior to mixing said driving stream with said subcooled fluid.

10. The method of claim 1 including the step of at least partially atomizing said subcooled fluid prior to mixing with said driving stream.

11. The method of converting thermal energy into electrical energy comprising the steps of heating a vaporizable conductive liquid to a vapor state, injecting said vapor into a nozzle, expanding said vapor so that the enthalpy of said vapor is transformed to kinetic energy to produce a driving stream, injecting into said stream a subcooled portion of said conductive liquid at a point so that the kinetic energy of said stream accelerates the resultant mixed fluid while said vapor is substantially condensed by contact with said subcooled portion, and passing the resultant conductive working fluid through a magnetic field to convert at least a portion of said kinetic energy to electricity.

12. The method of converting thermal energy into electrical energy comprising the steps of vaporizing a first portion of an electrically conductive liquid, increasing the kinetic energy of said first portion, mixing said first portion with a subcooled second portion of said liquid so that the kinetic energy of the resultant mixture is increased and the heat content is simultaneously decreased, converting a first part of the energy of said resultant mixture into electrical energy, and converting a second part of the energy of said resultant mixture into static pressure.

13. The method of claim 12 wherein said mixing of said subcooled portion with said vaporized portion takes place after said vaporized portion has been expanded for a time sufficient to transform substantially all of its enthalpy to kinetic energy.

14. The method of converting thermal energy into electrical energy comprising the steps of vaporizing a first portion of an electrically conducting liquid, increasing the kinetic energy of said first portion, expanding said vaporized portion for a time sufficient to transform substantially all of its enthalpy to kinetic energy, then mixing said first portion with a subcooled second portion of said liquid so that the kinetic energy of the resultant mixture is increased and the heat content is simultaneously decreased, converting a first part of the energy of said resultant mixture into electrical energy, converting a second part of the energy of said resultant mixture into static pressure, then reducing the temperature of said resultant mixture to a predetermined subcooled temperature, passing a first portion thereof through a heat source to obtain said vaporized portion, and mixing the remaining subcooled portion with said vaporized portion for recycle in the system.

15. The method of converting thermal energy into electrical energy by mixing of two fluids at least one of which is electrically conductive, comprising the steps of heating a multicomponent fluid containing at least a readily vaporizable component and a component having a high specific heat to vaporize the readily vaporizable component to form a two-phase fluid, simultaneously increasing the kinetic energy of said two-phase fluid while decreasing its thermal energy to form a driving stream, mixing said driving stream with a subcooled fluid containing said high specific heat component so that a substantial portion of the vapor phase of said two-phase driving stream will condense out because of heat transfer between said driving stream and said subcooled fluid while simultaneously transferring the kinetic energy of the vapor of said driving stream to said subcooled fluid to form a resulting conductive working fluid, and passing said resulting conductive working fluid through a magnetic field to convert at least a portion of its kinetic energy to electrical energy.

16. The method according to claim 15 wherein said multicomponent conductive fluid consists essentially of lithium as high specific heat component and at least one alkali metal selected from sodium, potassium, rubidium and cesium as readily vaporizable component.

17. The method according to claim 15 wherein said readily vaporizable component and said component having a high specific heat are substantially immiscible.

18. The method of converting thermal energy into electrical energy by mixing of two fluids at least one of which is electrically conductive, comprising the steps of heating a readily vaporizable fluid to vaporize at least a portion thereof, increasing the kinetic energy of said fluid while simultaneously decreasing its thermal energy to form a driving stream, mixing said driving stream with a subcooled second fluid having a high specific heat so that a substantial portion of the vapor phase of said driving stream will condense out because of heat transfer between said driving stream and said subcooled fluid while simultaneously transferring the kinetic energy of the vapor of said driving stream to said subcooled fluid to form a resulting conductive working fluid, passing said resulting conductive working fluid through a magnetic field to convert a portion of its kinetic energy to electrical energy, converting a substantial portion of the remaining part of the energy of said resultant fluid into static pressure, then reducing the temperature of a first portion of the effluent working fluid to form said subcooled fluid, returning the remaining portion of said effluent fluid to the heat source for vaporization as the readily vaporizable component, and recycling said vaporized and subcooled fluids in the system.

19. The method of converting thermal energy into electrical energy comprising the steps of heating a multicomponent conductive fluid containing substantially immiscible components, at least one of which is readily vaporizable and another has a high specific heat, to vaporize the readily vaporizable fluid component, simultaneously increasing the kinetic energy of the vaporized fluid while decreasing its thermal energy to form a driving stream, mixing said driving stream with a conductive subcooled fluid containing said component having a high specific heat so that a substantial portion of the vapor phase of said driving stream will condense out because of heat transfer between said driving stream and said subcooled fluid while simultaneously transferring the kinetic energy of the vapor of said driving stream to said subcooled fluid to form a resulting conductive working fluid, passing said resulting conductive working fluid through a magnetic field to convert at least a portion of its kinetic energy to electrical energy, separating the effluent fluid into said readily vaporizable component and said component having a high specific heat, and recirculating the separated readily vaporizable component to a heat source, reducing the temperature of said high specific heat component, and separately recirculating said separated components for recycle in the system.

20. The method according to claim 19 wherein said high specific heat component consists essentially of lithium and said readily vaporizable component is selected from potassium, cesium, and rubidium.

References Cited by the Examiner

UNITED STATES PATENTS

| | | | |
|---|---|---|---|
| 923,680 | 6/1909 | Meyersberg | 60—40 |
| 1,050,410 | 1/1913 | Wainwright | 60—40 |
| 1,196,511 | 8/1916 | Borger | 310—11 |
| 2,151,949 | 3/1939 | Turner | 60—40 |
| 3,031,977 | 5/1962 | Elliot | 103—258 |

FOREIGN PATENTS

| | | |
|---|---|---|
| 29,508 | 1897 | Great Britain. |

MILTON O. HIRSHFIELD, *Primary Examiner.*

D. X. SLINEY, *Assistant Examiner.*